(12) United States Patent
Brown

(10) Patent No.: US 10,896,647 B2
(45) Date of Patent: Jan. 19, 2021

(54) DISPLAY PORT APPARATUS AND PROCESSING

(71) Applicant: NCR Corporation, Duluth, GA (US)

(72) Inventor: Richard E. Brown, Auburndale, FL (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/636,050

(22) Filed: Jun. 28, 2017

(65) Prior Publication Data

US 2019/0005892 A1 Jan. 3, 2019

(51) Int. Cl.
```
G09G 3/34        (2006.01)
G07G 1/00        (2006.01)
G06Q 20/20       (2012.01)
G07G 1/14        (2006.01)
G09G 3/20        (2006.01)
G09G 5/00        (2006.01)
G09G 3/36        (2006.01)
```
(52) U.S. Cl.
CPC ........... *G09G 3/3406* (2013.01); *G06Q 20/20* (2013.01); *G07G 1/0018* (2013.01); *G07G 1/14* (2013.01); *G09G 3/2096* (2013.01); *G09G 3/36* (2013.01); *G09G 5/006* (2013.01); *G09G 2320/0626* (2013.01); *G09G 2330/021* (2013.01); *G09G 2330/026* (2013.01); *G09G 2330/027* (2013.01); *G09G 2340/14* (2013.01); *G09G 2360/04* (2013.01); *G09G 2370/04* (2013.01); *G09G 2370/047* (2013.01)

(58) Field of Classification Search
CPC ....... G09G 2330/021; G09G 2330/027; G09G 2320/0626; G09G 5/006; G09G 5/10; G09G 2310/0237; G09G 3/36; G09G 3/3406; G09G 2330/026; G09G 3/2096; G06F 1/3265; G06F 1/3218; G06F 1/1647; G06F 1/1632; G06F 1/65; G06F 1/3203; G06F 21/606; G06F 21/35; G06F 21/84; G06F 19/00; G06Q 20/00; G06Q 20/202; G06Q 20/20; G06Q 20/04; G06Q 30/0268; G06Q 20/3226; G07G 1/14; G07G 1/0018
See application file for complete search history.

(56) References Cited

U.S. PATENT DOCUMENTS

| | | | | |
|---|---|---|---|---|
| 6,415,341 B1* | 7/2002 | Fry, Sr. | ..................... | G07G 1/14 710/62 |
| 6,598,799 B1* | 7/2003 | Jang | ..................... | G06F 19/3456 235/462.25 |
| 7,209,985 B2* | 4/2007 | Hayamizu | ............... | G06F 3/023 345/168 |
| 7,263,558 B1* | 8/2007 | Khirman | ................ | G06Q 30/00 709/229 |
| 8,184,933 B1* | 5/2012 | Aybay | ................. | G02B 6/3895 385/100 |

(Continued)

*Primary Examiner* — Dismery Mercedes
(74) *Attorney, Agent, or Firm* — Schwegman, Lundberg & Woessner

(57) ABSTRACT

A device is interposed between a first device display port and a second device display port. The device passes through signals provided from the first device display port to the second device display port except when predefined signals are detected. For the predefined signals, the device translates the predefined signals received from the first device display port into different signals that are provided to the second device display port.

10 Claims, 5 Drawing Sheets

(56) References Cited

U.S. PATENT DOCUMENTS

| | | | | |
|---|---|---|---|---|
| 9,274,992 B2* | 3/2016 | Altmann | G06F 13/4068 | |
| 10,089,835 B2* | 10/2018 | Ward | G07G 1/0018 | |
| 10,296,902 B2* | 5/2019 | Herwig | G06Q 20/382 | |
| 2002/0027162 A1* | 3/2002 | Jang | G06F 19/328 | 235/383 |
| 2003/0132292 A1* | 7/2003 | Gomez | G06Q 20/00 | 235/383 |
| 2005/0211773 A1* | 9/2005 | Nobutani | G06Q 20/209 | 235/383 |
| 2006/0119603 A1* | 6/2006 | Chen | G06F 3/1438 | 345/502 |
| 2009/0026255 A1* | 1/2009 | Besecker | G06Q 20/208 | 235/375 |
| 2010/0225640 A1* | 9/2010 | Vieri | G09G 3/3406 | 345/214 |
| 2011/0191480 A1* | 8/2011 | Kobayashi | H04N 21/43632 | 709/227 |
| 2011/0259672 A1* | 10/2011 | Kuo | G06Q 30/06 | 186/59 |
| 2013/0013390 A1* | 1/2013 | Paulson-Ellis | G06Q 20/208 | 705/14.38 |
| 2015/0149311 A1* | 5/2015 | Ward | G07G 1/0018 | 705/24 |
| 2015/0199882 A1* | 7/2015 | Fernando | G07G 1/0018 | 345/173 |
| 2016/0098740 A1* | 4/2016 | Bakker | G06O 20/201 | 705/14.23 |
| 2016/0125815 A1* | 5/2016 | Bar Shimon | G06K 7/1413 | 345/690 |
| 2016/0253638 A1* | 9/2016 | Herwig | G07F 7/1033 | 705/64 |
| 2017/0076268 A1* | 3/2017 | Gotanda | G06Q 20/204 | |
| 2017/0372286 A1* | 12/2017 | Hiroi | G06Q 20/202 | |
| 2019/0043446 A1* | 2/2019 | Suzuki | G06F 3/1431 | |

* cited by examiner

DISPLAY PORT APPARATUS AND PROCESSING

BACKGROUND

Many low-cost displays exists in the market. One particular popular low-cost display is a Liquid Crystal Display (LCD) panel that supports an embedded DisplayPort (eDP) video interface. Such LCD panels are popular for laptop computers.

These LCD panels do not independently control their own Light-Emitting Diode (LED) backlights.

In general, the backlight life for LCD panels is between 15,000 and 50,000 hours. Because of this, the LED backlights need to be turned off when they are not in use to maximum the usable life of the LED backlights.

Because LCD panels are inexpensive, these LCD panels are often used as additional customer displays at Point-Of-Sale (POS) terminals and Self-Service Terminals (SSTs). The LCD panels are interfaced to the POS terminals or SSTs through cabling wires, such as High-Definition Multimedia Interface (HDMI) cords.

In practice, these additional displays often have to be replaced frequently because the LED backlights burn out, which makes what would be a low cost alternative for retailers become far more expensive than what was originally anticipated by the retailers.

SUMMARY

In various embodiments, a display port apparatus and processing for controlling a display is presented.

According to an embodiment, a display port apparatus is presented. The display port apparatus includes: a first port, a second port, and circuitry. The first port for coupling a first cable to a first device. The second port for coupling a second cable to a second device. The circuitry configured to pass through first data signals received over the first cable to the second cable, and the circuitry configured to detect second data signals received over the first cable and provide different second data signals over the second cable.

DETAILED DESCRIPTION

Figure 1A:
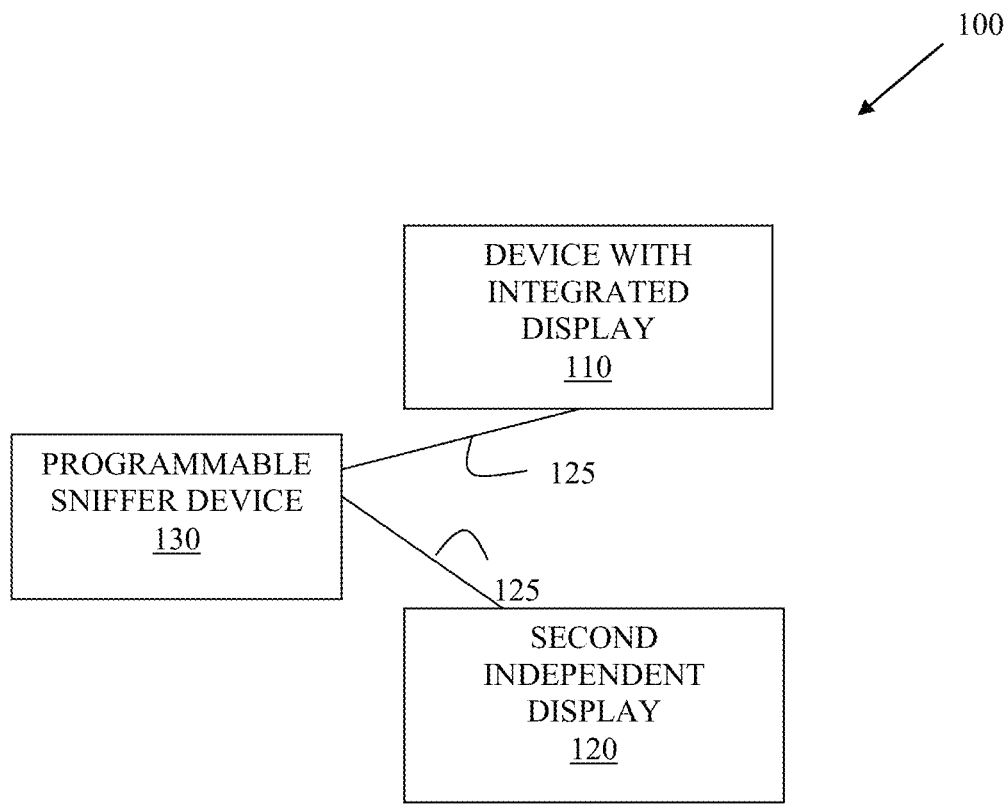
FIG. 1A is a diagram of a system for display port processing, according to an example embodiment.

FIG. 1A is a diagram of a system 100 for display port processing, according to an example embodiment. The various components are illustrated and the arrangement of the components is presented for purposes of illustration only. It is to be noted that other arrangements with more or less components are possible without departing from the display port apparatus and display port processing presented herein and below.

The system 100 includes a device 110 having an integrated and primary display 110, a second independent display device 120, and a programmable sniffer device 130.

The device 110 is communicates with the second display 120 through cabling 125, such as but not limited to, Ethernet, HDMI, etc. Typically, the cabling is connected directly from a display port of device 110 to a display port of display 120. However, this typical connection is altered with the teachings presented herein, such that the cabling 125 is connected from a display port of device 110 to a display port of the sniffer device 130, a second cable is then connected from another display port of the sniffer device 130 to the display port of display 120. This allows communication from the device 110 to be monitored by the sniffer device 130. The second display 120 views the connection to the sniffer device 130 as a connection being made from the device 110 and the logic that processes on both device 110 and display 120 is unmodified with the teachings presented herein with the introduction of the sniffer device 130. That is, whatever the logic was capable of performing on both the device 110 and display 120 remains unchanged with the addition of the sniffer device 130.

The sniffer device 130 simply relays audio, video, and command data passed between the device 110 and the display 120 through the cabling 125. The sniffer device 130 is programmed to listen on the auxiliary channel for commands being sent from the device 110 to the display 120. These commands include power on, power off, detach, and sleep mode. The commands are translated to commands recognized by the display 120 to cause the display 120 to turn backlights on and off according to what was detected over the auxiliary channel from the device 110.

That is, when the sniffer 130 detects a power on from the device 110, the sniffer 130 propagates a "backlights on" signal over the auxiliary channel through the cabling 120 to the display 120. Moreover, when the sniffer 130 detects a power down, detach, and sleep mode from the device 110, the sniffer 130 propagates a "backlights off" signal over the auxiliary channel through the cabling to the display 120. The backlights on signal and backlights off signals cause the display 120 to properly turn on its backlights and turn off its backlights because backlights on and backlights off are recognized commands processed by the existing logic of the display 120. Thus, control of the backlights for display 120 can be achieved through the sniffer 130.

The display 120 is a type of display that lacks logic to independently turn on and off its backlights, such as a low cost LCD panel and similar to LCD panels integrated into laptop computers that rely on the on chip control of the laptop. The display 120 includes support for eDP for properly providing audio and video sent over the cabling 125 from the device 110 to the display 120. Thus, when this type of display 120 is removed from the typical on chip control and used as a second independent display 120 to another device, such as device 110 and connected through cabling 125, the only mechanism for achieving backlight control is through commands that the on chip logic would typically provide to the logic of the display 120.

The sniffer 130 is coupled between the connection between the display port of the device 110 and the display port of the display 120. Thus, commands propagated as signals over the auxiliary channel of the cabling 125 from the device 110 that indicate that display of the device 110 is in a sleep mode or off can be translated and converted by the sniffer and propagated as different signals that the existing logic of the display 120 recognizes as backlights on and backlights off. This allows for an extended life of the display 120 from what has heretofore been available in the industry because intelligent backlight control (which has been unavailable in the industry) is achieved through the sniffer 130.

In an embodiment, the sniffer 130 can also listen over the audio and video channels of the cabling 125 to interject additional processing that may be unsupported or unavailable with the existing logic of the display 120. For example, some video and audio formats that are provided by the device 110 may be unsupported by the logic of the display 120. Conversion logic can be provided on the sniffer 130 for properly converting the audio and video formats between the device 110 and display 120. In this embodiment, the sniffer 130 translates the audio and video between the device 110 and the display 120 as the audio and video is being supplied from the device 110 to the display 120 over the cabling 125. In an embodiment, the initial two-way negotiation between the device 110 and the display 120 for initial handshaking before audio and video is provided can be altered through logic of the sniffer 130.

Figure 1B:
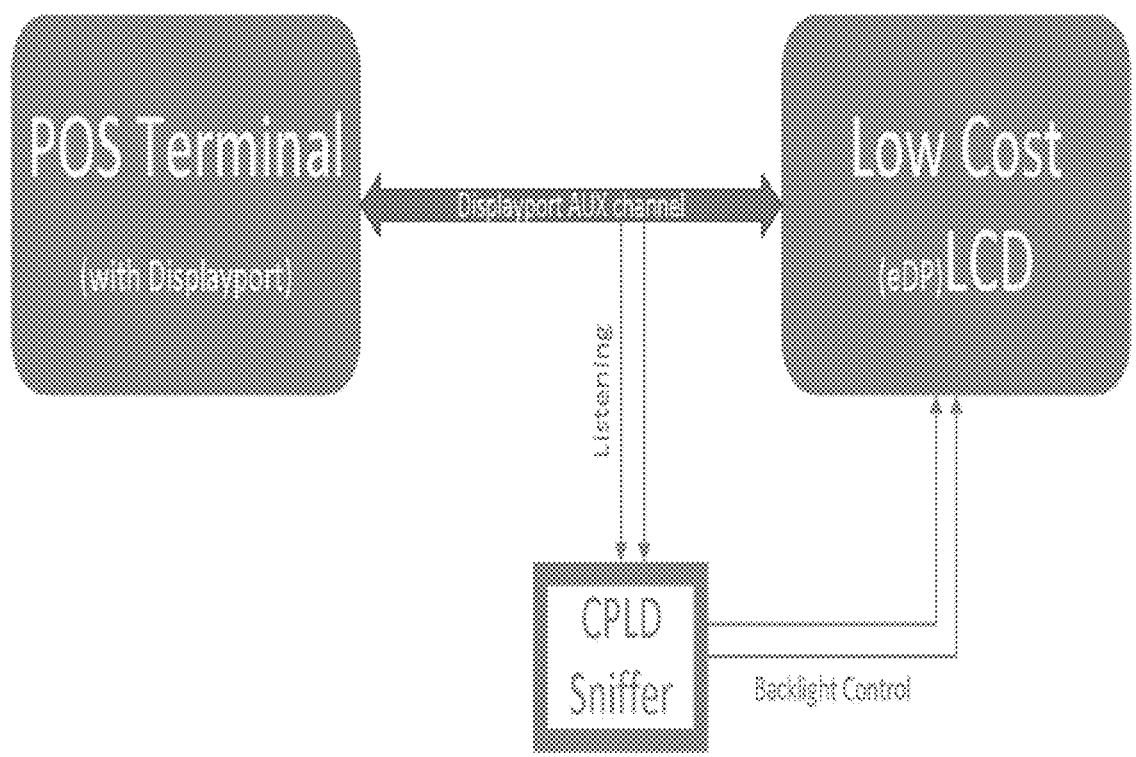
FIG. 1B is a diagram of another system for display port processing, according to an example embodiment.

The FIG. 1B is a diagram of another system for display port processing, according to an example embodiment.

The POS terminal in the FIG. 1B is the device 110 presented with the system 100. The low cost (with an embedded DisplayPort (eDP) interface) LCD of the FIG. 1B is the display 120, and the CPLD sniffer of the FIG. 1B is the sniffer 130 of the system 100. The FIG. 1B shows one embodiment of the system 100 within a retail environment having a POS terminal with a second independent LCD panel/display (such as for customer viewing whereas the POS terminal includes its own independent display for a clerk that operates the POS terminal).

The CPLD sniffer is a low cost Complex Programmable Logic Device (CPLD). The CPLD sniffer is programmed for listening over the auxiliary channel for specific command signals propagated by the POS terminal that indicate the LCD panel should turn on or turn off its backlights. Other communications between the POS terminal and the LCD are not interfered with or altered, such that all other normal communication between the graphics controller of the POS terminal and the logic of the LCD panel remain unchanged and unmodified and function normally. Signals that the CPLD is programmed to listen for are then translated into signals that the logic of the LCD panel recognizes as backlights on or backlights off and propagated as signals over the auxiliary channel to the LCD panel.

In an embodiment, the CPLD sniffer is hardwired to pass through communications (data transmitted between the POS terminal and the LCD panel) over the audio and visual channels. The CPLD sniffer is also hardwired to pass through communications through the auxiliary channel except when a small set of signals are detected indicating that the LCD panel should turn on or turn off its backlights, when these signals are detected an alternative signal is propagated over the auxiliary channel by the CPLD sniffer that the LCD panel recognizes as a backlights on or backlights off command. That is, the CPLD sniffer is programmed through specialized hardware circuitry that detects specific signals and converts those signals to different signals.

The above discussed embodiments and other embodiments are now discussed with reference to the FIGS. 2-4.

Figure 2:
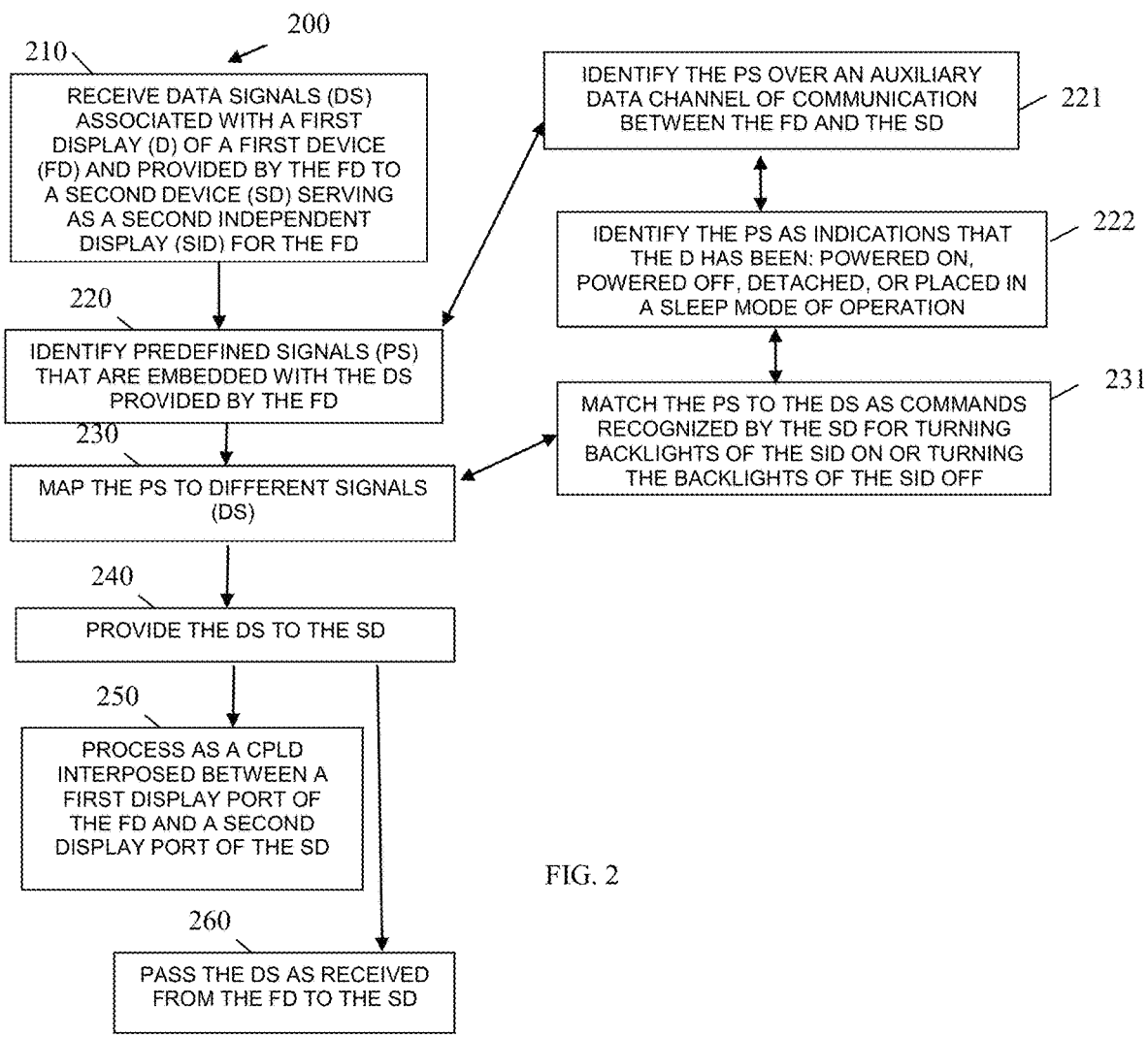
FIG. 2 is a diagram of a method for display port processing, according to an example embodiment.

FIG. 2 is a diagram of a method 200 for display port processing, according to an example embodiment. The hardware/software module(s) that implements the method 200 is referred to as a "display sniffer." In an embodiment, the display sniffer is implemented as specialized hardware circuitry to perform the processing discussed below for the display sniffer. In an embodiment, the display sniffer is implemented as executable instructions programmed and residing within memory and/or a non-transitory computer-readable (processor-readable) storage medium and executed by one or more processors of a device.

In an embodiment, the display sniffer is the programmable sniffer device 130.

In an embodiment, the display sniffer is the CPLD sniffer of the FIG. 1B.

In an embodiment, the display sniffer is a specialized CPLD.

At 210, the display sniffer receives data signals associated with a first display of a first device that are provided by the first device to a second device. The second device serving as a second and independent display for the first device. This is done by interposing the display sniffer between the display-based communications of the first device and the second device (such as by connecting a cable from a display port of the first device to a first display port of the device processing the display sniffer and connecting another cable from a second display port of the device processing the display sniffer to a display port of the second device).

At 220, the display sniffer identifies predefined signals that are embedded with the data signals provided by the first device.

According to an embodiment, at 221, the display sniffer identifies the predefined signals over an auxiliary data channel of communication that exists between the first device and the second device.

In an embodiment of 221 and at 222, the display sniffer identifies the predefined signals as indications that the first display of the first device has been: powered on, powered off, detached, or placed in a sleep mode of operation.

At 230, the display sniffer maps the predefined signals to different signals.

In an embodiment of 222 and 230, at 231, the display sniffer matches the predefined signals to the different signals as commands recognized by the second device for turning backlights of the second and independent display on or turning the backlights of the second and independent display off.

At 240, the display sniffer provides the different signals to the second device.

It is noted that the predefined signals do not have to be removed from the communications because the second device may not recognize the predefined signals for processing commands and as such the second device may ignore the predefined signals. Therefore, in some embodiments, the display sniffer does not remove any data signals provided from the first device to the second device and provides the different signals as added data signals provided to the second device.

According to an embodiment, at 250, the display sniffer is processed as a CPLD that is interposed between a first display port of the first device and a second display port of the second device. This arrangement was discussed above with reference to the FIG. 1A.

In an embodiment, and as already discussed, at 260, the display sniffer passes the data signals as received from the first device through to the second device.

Figure 3:
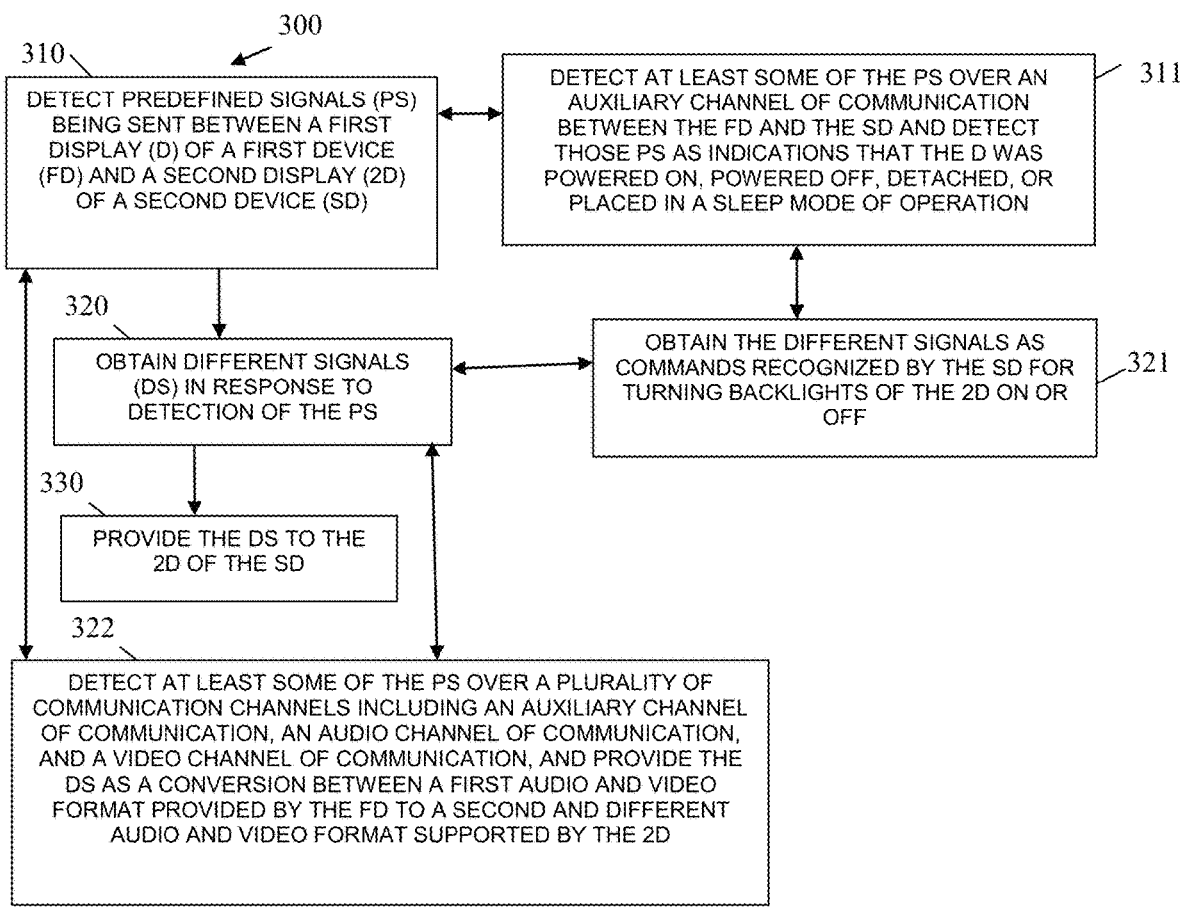
FIG. 3 is a diagram of another method for display port processing, according to an example embodiment.

FIG. 3 is a diagram of another method 300 for display port processing, according to an example embodiment. The hardware/software module(s) that implement the method 300 is referred to herein as a "display controller." In an embodiment, the display controller is implemented as specialized hardware circuitry for performing the processing discussed below for the display controller. In an embodiment, the display controller is implemented as executable instructions and programmed within memory and/or a non-transitory computer-readable (processor-readable) storage medium that executes on one or more processors of a device.

The display controller presents another and in some ways enhanced processing perspective of the display sniffer (discussed above with reference to the FIG. 2).

In an embodiment, the display controller is the programmable sniffer device 130.

In an embodiment, the display controller is the CPLD sniffer of the FIG. 1B.

In an embodiment, the display controller performs all or some combination of the processing discussed above with the FIGS. 1A-1B and 2.

In an embodiment, the display controller is a specialized CPLD.

At 310, the display controller detects predefined signals being sent between a first display of a first device and a second display of a second device. The second display serving as an external and additional display for the first device.

In an embodiment, at 311, the display controller detects at least some of the predefined signals over an auxiliary channel of communication between the first device and the second device, where those detected predefined signals provide indications that the first display was powered on, powered off, detached, or placed in a sleep mode of operation.

At 320, the display controller obtains different signals in response to detection of the predefined signals.

In an embodiment of 311 and 320, at 321, the display controller obtains the different signals as commands recognized by the second device for turning backlights of the second display on or off.

In an embodiment of 310 and 320, at 322, the display controller detects at least some of the predefined signals over a plurality of communication channels including: an auxiliary channel of communication, an audio channel of communication, and video channel of communication. The display controller provides the different signals, at least partially, as a conversion between a first audio and video format provided by the first device to a second and different audio and video format supported by the second device. Here, unlike what was discussed above with the FIG. 2, some of the signals provided from the first device to the second device may be replaced by some of the different signals (which represent the conversion between audio and video formats).

At 330, the display controller provides the different signals to the second display of the second device.

Figure 4:
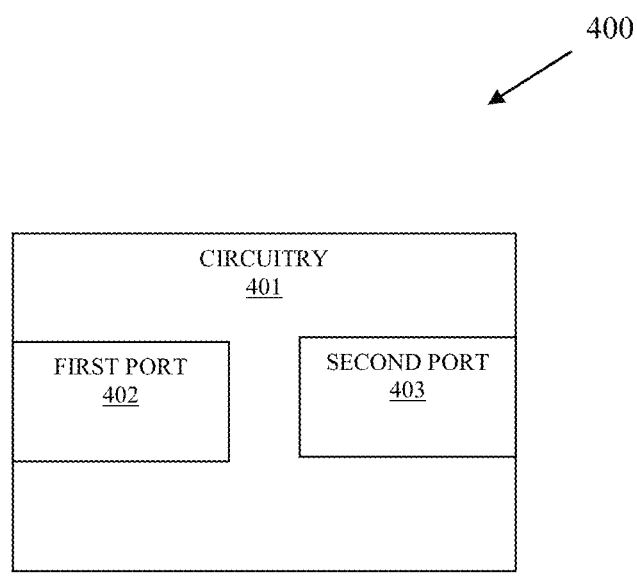
FIG. 4 is a diagram of a display port apparatus, according to an example embodiment.

FIG. 4 is a diagram of a display port apparatus 400, according to an example embodiment. The apparatus 400 is programmed through specialized hardware circuitry.

In an embodiment, the apparatus 400 is the programmable sniffer device 130.

In an embodiment, the apparatus 400 is the CPLD device of the FIG. 1B.

In an embodiment, the apparatus 400 performs all or some combination of the processing discussed in the FIGS. 1A-1B and 2-3.

The apparatus 400 includes a first port 402, a second port 403, and circuitry 401.

The first port 402 provides a hardware connection for coupling a first cable to a first device.

In embodiment, the first device is a POS terminal. In an embodiment, the POS terminal is a SST terminal.

The second port 403 provides a hardware connection for coupling a second cable to a second device.

In an embodiment, the second device is a LCD panel.

In an embodiment, the first and second ports (402 and 403) are display ports that provide a connection from a first display port of the first device to the apparatus 400 and a second connection to a second display port of the second device.

In an embodiment, the first and second cables are cables that support an embedded DisplayPort (eDP) interface and connectable to display ports.

The circuitry 401 is configured to pass through first data signals received over the first cable to the second cable. The circuitry 402 is also configured to detect second data signals received over the first cable and provide different second data signals over the second cable.

In an embodiment, the first data signals are provided over audio and video channels (wires) within the first and second cables. In an embodiment, the second data signals are provided over an auxiliary channel (wire) within the first and second cables.

In an embodiment, the second data signals are associated with a first display of the first device being powered on, powered off, detached, or in a sleep mode of operation. In an embodiment, the different data signals are recognized by the second device as a command for turning off backlights of a display for the second device or for turning on the backlights of the display.

In an embodiment, the circuitry 401 is a CPLD device with specialized hardware circuitry for selectively controlling the backlighting of a display associated with the second device based on a state of a display associated with the first device.

One now appreciates how a low cost LCD panel device can be used as an extended or additional external display to a POS terminal and the backlighting can still be controlled in an unobtrusive, transparent, and cost effective manner so as to extend the useful life of the LCD panel. Heretofore, this has not be achievable in the industry because low cost LCD panels typically are controlled by an on-chip device and the backlights cannot be controlled by an externally connected device.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving, by a display sniffer device, data signals associated with a first display integrated into a computer and provided from the computer to an independent display device;
   identifying, by the display sniffer device, predefined signals that are embedded with the data signals provided from the computer;
   mapping, by the display sniffer device, the predefined signals to different signals;
   providing, by the display sniffer device, the different signals to the independent display device; and
   controlling, by the display sniffer device, backlights of the independent display device through the providing of the different signals with existing programming logic associated with and installed on the computer and the independent display device remaining unchanged when controlling the backlights, wherein the independent display device lacks backlight logic to independently turn on and off the backlights when the independent display device is being used as a second display for the computer, and wherein an only mechanism of the independent display device to control the backlights is through on chip logic when the independent display device is used as a primary display device, and wherein the sniffer display device provides the different signals to the independent display device as backlight control commands recognized by the on chip logic of the independent display device to the control the backlights.

2. The method of claim 1 further comprising, processing the method on the display sniffer device as a Complex Programmable Logic Device (CPLD) interposed between a first display port of the computer and a second display port of the independent display device.

3. The method of claim 1 further comprising, passing, by the display sniffer device, the data signals as received from the computer to the independent display device.

4. The method of claim 1, wherein identifying further includes identifying the predefined signals over an auxiliary data channel of communication between the computer and the independent display device.

5. The method of claim 4, wherein identifying the predefined signals as indications that the first display has been powered on, powered off, detached, or placed in a sleep mode of operation.

6. The method of claim 5, wherein mapping further includes matching the predefined signals to the different signals as commands recognized by the independent display device for turning the backlights of the independent display device on or turning the backlights of the independent display device off.

7. A method, comprising:
   detecting, by a display sniffer device, predefined signals being sent between a first display integrated into a computer to an independent display device having backlights;
   obtaining, by the display sniffer device, different signals in response to detection of the predefined signals;
   providing, by the display sniffer device, the different signals to the independent display device; and
   controlling, by the display sniffer device, a backlight of the independent display device with the providing utilizing existing programming logic installed on the computer and the independent display device, wherein the existing programming logic remains unchanged when controlling the backlight, wherein the independent display device lacks backlight logic to independently turn on and off the backlight when the independent display device is being used as a second display for the computer, and wherein an only mechanism of the independent display device to control the backlights is through on chip logic when the independent display device is used as a primary display device of the computer, and wherein the sniffer display device provides the different signals to the independent display device as backlight control commands recognized by the on chip logic of the independent display device to the control the backlight.

8. The method of claim 7, wherein detecting further includes detecting at least some of the predefined signals over an auxiliary channel of communication between the computer and the independent display device and detecting those predefined signals as indications that the first display was powered on, powered off, detached, or placed in a sleep mode of operation.

9. The method of claim 8, wherein obtaining further includes obtaining the different signals as commands recognized by the independent display device for turning the backlights of the independent display device on or off.

10. The method of claim 7, wherein detecting further includes detecting at least some of the predefined signals over a plurality of communication channels including an auxiliary channel of communication, an audio channel of communication, and a video channel of communication, and wherein obtaining further includes providing the different signals as a conversion from a first audio and video format provided by the computer to a second and different audio and video format supported by the independent display device.

* * * * *